United States Patent [19]

Kudchadker et al.

[11] 4,072,192

[45] Feb. 7, 1978

[54] SULFOMETHYLATED LIGNITE SALT AS A SACRIFICAL AGENT IN OIL RECOVERY PROCESSES

[75] Inventors: Mohan V. Kudchadker, Houston; Walter J. Weiss, Sugarland, both of Tex.

[73] Assignee: Texaco Inc., New York, N.Y.

[21] Appl. No.: 655,188

[22] Filed: Feb. 4, 1976

[51] Int. Cl.$^2$ ............................................. E21B 43/22
[52] U.S. Cl. .................................... 166/273; 166/274; 166/275; 252/8.55 D
[58] Field of Search ........................ 252/8.55 D, 8.5 C; 166/273, 274, 275

[56] References Cited

U.S. PATENT DOCUMENTS

| | | | |
|---|---|---|---|
| 3,034,982 | 5/1962 | Monroe | 252/8.5 |
| 3,469,630 | 9/1969 | Hurd et al. | 166/273 X |
| 3,629,105 | 12/1971 | Weiss | 252/8.55 |
| 3,700,031 | 10/1972 | Germer et al. | 166/273 X |
| 3,777,817 | 12/1973 | Feuerbacher et al. | 166/274 |
| 3,797,574 | 3/1974 | Feuerbacher et al. | 166/274 |
| 3,811,505 | 5/1974 | Flournoy et al. | 166/274 |

Primary Examiner—Herbert B. Guynn
Attorney, Agent, or Firm—Carl G. Ries; Thomas H. Whaley; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of sulfomethylated lignite salt as a sacrificial agent to inhibit the deposition of surfactant and/or polymer on the reservoir matrix. The process may be carried out by first injecting the sulfomethylated lignite salt into the formation through the injection well and following them with either a polymer or a surfactant solution which may also contain sulfomethylated lignite salt. The polymer and/or surfactant would then be followed by a drive fluid such as water to push the chemicals to the production well.

18 Claims, No Drawings

4,072,192

SULFOMETHYLATED LIGNITE SALT AS A SACRIFICAL AGENT IN OIL RECOVERY PROCESSES

BACKGROUND OF THE INVENTON

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65-90 percent or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution affecting a reduction in this interfacial tension between water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,333,381. Other specialized surfactants, as will be discussed later, have been discovered to have special properties useful in water flooding operations such as a tolerance for high salinity and calcium, and/or magnesium ion concentrations often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery technique involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the growth portion of the reservoir which is swept and unswept by the injected fluid. A major cause of poor sweep efficiency is associated with the fact that the injected fluid generally has a lower viscosity than the displaced fluid or petroleum. Thus, the injected fluid has a higher mobility and tends to finger through the oil, thus prematurely breaking through to the production well.

The solution to this high mobility problem is to increase the viscosity of the driving fluid. One way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increased sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,424,054 discloses the use of aqueous solutions of pyridine; U.S. Pat. No. 3,459,630 discloses the use of sodium carbonate and inorganic polyphosphates, and U.S. Pat. No. 3,437,141 discloses the use of soluble carbonates, inorganic polyphosphates and sodium borate in combination with a saline solution of a surfactant having both a high and a low molecular weight component. These materials have not been completely satisfactory from a standpoint of performance and economics however.

SUMMARY OF THE INVENTION

The invention is a process of producing petroleum from subterranean formations having an injection well and a production well in communication therewith. The process comprises injecting into the formation via the injection well an aqueous solution of sulfomethylated lignite salt and then injecting via the injection well into the formation a chemical oil recovery agent, for example, surfactant (which may or may not contain sulfomethylated lignite salt) and/or polymer. It is the usual practice to then inject a fluid such as water to sweep the chemical components through the reservoir to the production well, thereby displacing oil from the subterranean formation to the surface of the earth. Alternatively, the sulfomethylated lignite salt may be injected in admixture with the surfactant solution.

DESCRIPTION OF THE PREFERRED EMBDDIMENTS

A sacrificial material is injected by the process of this invention through an injection means comprising one or more injection wells into a subterranean petroleum-containing formation to preferably occupy or cover all potential adsorption sites of the rock within the subterranean formation, thereby reducing the extent of adsorption of the more expensive chemical oil recovery agent injected therebehind. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional group on the sacrificial agent molecules enhances adsorption either by hydrogen bonding or electrostatic attraction to active sites on the rock surfaces.

A satisfactory sacrificial material has at least three important characteristics. First, it should be less expensive than the surfactant on cost effectiveness basis since it is to be sacrificed or adsorbed by the formation, probably not to be recovered. Next, it must be adsorbed readily by the subterranean formation matrix. Preferably, the sacrificial material should be adsorbed more readily than the chemical oil recovery agent to be used in the process. This will enable the sacrificial agent to be used not only as a preflush but in admixture with the chemical recovery material. The third important characteristic of a sacrificial agent is that the presence of such adsorbed sacrificial material must retard or eliminate the subsequent adsorption of the surfactant and/or polymer chemical recovery material on the adsorption site of the formation rock. By adsorption sites of the formation rock is meant those parts of the surfaces of the pores of the formation rock capable of adsorbing a chemical compound from a solution on contact.

The sacrificial material does not normally have any appreciable effect on the recovery efficiency of the chemical flooding operation. Additional oil is recovered only if the sacrificial material is followed by or is admixed with a surfactant and/or a chemical recovery agent which will effectively increase the amount of oil displaced from the subterranean formation. When the surfactant is chosen as the chemical recovery agent it should be injected after the sacrificial agent or in admixture therewith and ahead of the following flooding water, thereby acheiving the desired interfacial tension reduction between the injected fluid and the displaced fluid with minimal loss of surfactant on the formation matrix. The surfactant may be present in a hydrocarbon solvent or in an aqueous solution or in a combination thereof. Any anionic or nonionic type of surfactant known in the art may be used in the practice of this invention. Some types of surfactants were mentioned previously. In addition, surfactants disclosed and claimed in the following U.S. patents are particularly useful since they have been found to be capable of performing in reservoirs having both high salinities and high hardness levels: U.S. Pat. Nos. 3,858,656; 3,811,505; 3,811,504; 3,811,507.

The chemical recovery agent may be a micellar dispersion of surfactant and hydrocarbon. These dispersions offer advantages including a higher viscosity than aqueous surfactant solutions.

Likewise, the amount of surfactant which must be employed in the practice of any chemical flood is generally known in the art and is to be found in published literature. However, the slug size of surfactant generally will range from about 0.01 to 1 pore volumes of an aqueous surfactant solution having dissolved therein from about 0.001 to about 10.0 percent by weight of the surfactant itself. As mentioned before, in addition to a preflush or a substitution thereof, a certain amount of the sacrificial material may also be added to the surfactant solution to prevent the adsorption of the surfactant on the formation matrix.

In a broad embodiment of this invention, a sacrificial material is injected into a petroleum reservoir ahead of a surfactant slug. In another embodiment the sacrificial agent is injected in admixture with the surfactant slug into the petroleum formation. This surfactant sacrificial agent mixture may or may not be preceded by a slug of sacrificial material only.

In any of these embodiments and others which are obvious to those skilled in the art, the surfactant containing slug may be followed by a material to taper the viscosity before drive water is injected. This technique known well to those skilled in the art prevents the water from fingering into the more viscous surfactant containing slug.

A specific embodiment of this invention, a sacrificial material comprising sulfomethylated lignite salt, is injected via the suitable injection means, i.e., through one or more injection wells completed in the subterranean hydrocarbon formation, so that the sacrificial material enters the formation ahead of the surfactant. The surfactant which may contain sulfomethylated lignite salt is then injected into the subterranean hydrocarbon-containing formation followed by a slug of polymer solution and the injection water to drive it to the production well. By injecting the sacrificial material in this particular sequence, the sacrificial material adsorbs on and occupies the sites existing in the matrix of the formation thereby eliminating or substantially decreasing the tendency for the subsequently injected surfactant and/or polymer to adsorb on the rock matrix.

The sacrificial agents useful in the process of my invention are sulfomethylated lignite salts. Sulfomethylated lignite salts are used in the prior art as scale inhibitors and drilling mud additives. U.S. Pat. No. 3,629,105 discloses a method for scale inhibition and a method for preparation of sulfomethylated lignite salts. That disclosure is hereby incorporated by reference herein. The sulfomethylated lignite salts must be water soluble.

In general, sulfomethylated lignite salts are prepared by reacting lignite, preferably a high humic acid lignite, in the presence of caustic soda, with a soluble sulfite or sulfurous acid and formaldehyde or acetone solution at an elevated temperature. As will hereinafter more fully appear, a chromate or dichromate may also be advantageously added either before or after the reaction.

The reaction can be carried out in the presence of approximately stoichiometric quantities of a methylene compound such as aldehyde or methyl ketone to introduce methylene or substituted methylene radicals into the sulfonate radical, as for example, the sulfomethylate group.

$$-R-SO_3X$$

where R represents a methylene radical and X represents an alkali metal group.

The reaction may take place at various elevated temperatures for varying times, but I prefer to raise the temperature of the slurry rapidly under pressure to an end point temperature of 500° F. or less, normally in the range of 350° F. to 500° F.

The rate of heating does not appear to be as critical as the end point temperature and effective materials can be produced with heat-up times as short as a minute or two. For practical commercial reasons the heating step normally will not substantially exceed an hour, with a practical heat-up time being in the range of three to ten minutes.

The following is an example of a preferred preparation involving the following ingredients:
  Water — 250 cc.
  Caustic soda — 9 gms.
  Sodium sulfite (anhydrous) — 38.3 gms.
  40% formaldehyde solution — 22.5 cc.
  Drilling mud grade lignite — 75 gms.
  Sodium chromate (anhydrous basis) — 2.5 gms.

Formulation proceeds as follows: The caustic soda is dissolved in the water and the sodium sulfite thereafter added with mixing until solution is effected. Subsequently the formaldehyde is added and mixing continued for 10-15 minutes. At this time the lignite is incorporated and mixed for five minutes.

The resultant slurry is then heated in a high temperature reactor to 500° F. end point temperature in 1 hour or less. The sodium chromate is added to the slurry, preferably as a concentrated aqueous solution after the slurry is reduced to ambient temperature.

For ease in handling and storing it has been found preferable to thereafter dry the mixture rather than to handle it as a slurry. Hence the slurry is either dried on a drum drier or spray drier, producing a free-flowing dry powder.

As has been indicated, the sodium chromate addition may be omitted although it is found to contribute to the beneficial effects in operations involving rather substantial high temperatures.

It is to be noted that sodium dichromate can be substituted for the chromate of the above example, since in the alkaline environment the dichromate undergoes reaction to the chromate and does not function as an oxidizer. In general the chromates and dichromates may be added in the form of the alkali metal or ammonium chromates or dichromates.

The cations associated with the sulfomethylated lignite salts of this invention may be any that will render the sulfomethylated lignite salts water soluble. These may include sodium, potassium and ammonium.

The quantity of sacrificial sulfomethylated lignite salt materials to be injected into the subterranean hydrocarbon formation may be any amount up to and including an amount sufficient to occupy substantially all of the active sites of the formation matrix. If less than the maximum amount is used, there will be a corresponding increase in the adsorption of surfactant from injection solution onto the formation matrix, although the amount of increase will not be as great as in the case where the formation is completely free of sacrificial sulfomethylated lignite salts. At a maximum, only the amount of sulfomethylated lignite salts needed to completely occupy the active sites on the formation is needed. Ordinarily from about 7.5 to about 75 pounds per square foot of formation of sulfomethylated lignite salts would be sufficient to prevent substantial adsorption of surfactant onto the formation matrix. The detriment resulting from using excess sulfomethylated lignite salts would be an increase in the cost of operating the oil recovery program.

The amount of sacrificial sulfomethylated lignite salts needed in the process of the invention depends on the particular formation, the area or pattern to be swept and other formation characteristics. Those skilled in the art can determine the exact quantity needed to afford the desired amount of protection.

EXPERIMENTAL

Experiments were performed to test the effectiveness of water soluble cellulose derivatives in reducing surfactant loss. The systems were checked both in sandstone as well as in limestone environments.

Three separate sets of experiments were used. These were: (1) Tolerance of the sulfomethylated lignite salts to $Na^+$, $Ca^{++}$, $Mg^{++}$, and other such ions existing in a reservoir environment, (2) Capillary displacement compatibility with surfactant solutions, and (3) Adsorption tests using precipitated calcium carbonate and sandstone. Results of these tests are summarized in the following paragraphs:

1. Tolerance to $Na^+$, $Ca^{++}$, $Mg^{++}$, etc.:

The sulfomethylated lignite salts did not precipitate out when contacted with waters containing around 220,000 ppm total dissolved solids and having in them $Ca^{++}$ and $Mg^{++}$ concentrations of up to 9,000 ppm.

2. Capillary Displacement Tests:

Using sodium dodecyl benzene sulfonate and a 9.5 mole ethylene oxide adduct of nonylphenol as the surfactant system, the effect of addition of sulfomethylated lignite salts on capillary displacement was investigated. Results are tabulated below:

TABLE I

| | | | | Capillary Displacement | | | | | | | |
|---|---|---|---|---|---|---|---|---|---|---|---|
| | | | | Room Temperature | | | | 109° F. | | | |
| Sample No. | Sulframin 1240* | TDS ppm | SMLS | 5** | 10 | 15 | 20 | 5 | 10 | 15 | 20 |
| | | | | mm | mm | mm | mm | mm | mm | mm | mm |
| 1 | 1.0% | 62k | 0% | 10.2 | 12.5 | 16 | 16 | 0.6 | 1.0 | 1.8 | 2.2 |
| 2 | 1.0% | 62k | 0.2% | 10.2 | 13.5 | 17 | 19.5 | 0.8 | 1.5 | 1.8 | 2.6 |
| 3 | 1.0% | 62k | 0.1% | 10.2 | 15.2 | 18.2 | >20 | 0.6 | 1.2 | 1.8 | 2.5 |
| 4 | 1.0% | 62k | 0.05% | 10.3 | 14.5 | 18.5 | >20 | 0.6 | 1.2 | 2.0 | 3.2 |
| 5 | 1.0% | 62k | 1.0% | 8.0 | 11.5 | 12.7 | 15.0 | 0.5 | 1.1 | 2.0 | 2.5 |

*N-95 is a 9.5 mole ethylene oxide adduct of nonylphenol Sulframin 1240 is dodecyl benzene sulfonate.
**Minutes.

From this data it can be seen that the sulfomethylated lignite salts did not show any detrimental effects on the capillary displacements of the surfactant system under consideration.

3. Adsorption Tests:

Using the surfactant system of sodium dodecyl benzene sulfonate and a 9.5 mole ethylene oxide adduct of nonylphenol with precipitated calcium carbonate as the substrate, the effectiveness of sulfomethylated lignite salts in reducing sulfonate loss was determined. The following table shows a summary of the results:

TABLE II

| Test No. | Sulfomethylated Lignite Salts CMC | Sulfonate Loss Reduction |
|---|---|---|
| 1 | 0.05% | 24% |
| 2 | 0.1% | 45% |
| 3 | 0.2% | 57% |

These results demonstrate the effectiveness of water-soluble derivatives of sulfomethylated lignite salts in reducing surfactant loss in tertiary recovery processes.

The effectiveness of this invention for reducing the adsorption of surfactant or polymer on formation rock and chemical flooding operations is demonstrated by the following examples which are presented by way of illustration and are not intended as limiting the spirit and scope of the invention as defined in the claims.

I claim:

1. A method for recovering oil from a subterranean formation containing oil and having an injection well and a production well wherein flooding water is injected into the subterranean formation comprising:
   (a) injecting through an injection well into the formation an aqueous solution of sulfomethylated lignite salt in an amount sufficient to adsorb on and occupy the active sites of the formation matrix and thereby diminish surfactant adsorption on said formation matrix,
   (b) subsequently injecting into the formation via the injection well an aqueous anionic surfactant solution effective for enhancing oil displacement efficiency of the flooding water,
   (c) subsequently injecting into the formation via the injection well flooding water; and
   (d) producing oil from the formation via the production well.

2. A method as in claim 1 wherein the cation of the sulfomethylated lignite salt is selected from the group consisting of sodium, potassium and ammonium.

3. A method as in claim 1 wherein the amount of sulfomethylated lignite salt is sufficient to occupy substantially all of the active sites on the formation matrix.

4. In a method for recovering oil from a subterranean formation containing oil and having an injection well and a production well wherein an aqueous anionic surfactant solution is injected into the injection well in order to drive the oil to the production well where it is produced the improvement which comprises:
   injecting into the injection well prior to the surfactant an aqueous solution of sulfomethylated lignite salt in an amount sufficient to adsorb on and occupy the active sites of the formation matrix and thereby diminish surfactant adsorption on said formation matrix.

5. A method as in claim 4 wherein the cation of the sulfomethylated lignite salt is selected from the group consisting of sodium, potassium and ammonium.

6. A method as in claim 4 wherein the amount of sulfomethylated lignite salt is sufficient to occupy substantially all of the active sites on the formation matrix.

7. In a method for recovering oil from a subterranean formation containing oil and having an injection well and a production well wherein an aqueous anionic surfactant solution is injected into the injection well in order to drive the oil to the production well wherein it is produced the improvement which comprises:
   injecting into the injection well in admixture with the surfactant sulfomethylated lignite salt in an amount sufficient to adsorb on and occupy the active sites of the formation matrix and thereby diminish surfactant adsorption on said formation matrix.

8. A method as in claim 7 wherein the cation of the sulfomethylated lignite salt is selected from the group consisting of sodium, potassium and ammonium.

9. A method as in claim 7 wherein the amount of sulfomethylated lignite salt is present in an amount sufficient to occupy substantially all of the active sites on the formation matrix.

10. A method for recovering oil from a subterranean formation containing oil and having an injection well and a production well wherein flooding water is injected into the subterranean formation comprising:
    (a) injecting through an injection well into the formation an aqueous solution of sulfomethylated lignite salt in an amount sufficient to adsorb on and occupy the active sites of the formation matrix and thereby diminish surfactant adsorption on said formation matrix,
    (b) subsequently injecting into the formation via the injection well an aqueous surfactant solution comprising anionic and nonionic surfactants,
    (c) subsequently injecting into the formation via the injection well flooding water; and
    (d) producing oil from the formation via the production well.

11. A method as in claim 10 wherein the cation of the sulfomethylated lignite salt is selected from the group consisting of sodium, potassium and ammonium.

12. A method as in claim 10 wherein the amount of sulfomethylated lignite salt is sufficient to occupy substantially all of the active sites on the formation matrix.

13. In a method for recovering oil from a subterranean formation containing oil and having an injection well and a production well wherein an aqueous surfactant solution comprising anionic and nonionic surfactants is injected into the injection well in order to drive the oil to the production well where it is produced the improvement which comprises:
    injecting into the injection well prior to the surfactant solution effective for enhancing oil displacement efficiency of the flooding water an aqueous solution of sulfomethylated lignite salt in an amount sufficient to adsorb on and occupy the active sites of the formation matrix and thereby diminish surfactant adsorption on said formation matrix.

14. A method as in claim 13 wherein the cation of the sulfomethylated lignite salt is selected from the group consisting of sodium, potassium and ammonium.

15. A method as in claim 13 wherein the amount of sulfomethylated lignite salt is sufficient to occupy substantially all of the active sites on the formation matrix.

16. In a method for recovering oil from a subterranean formation containing oil and having an injection well and a production well wherein an aqueous solution comprising anionic and nonionic surfactants is injected into the injection well in order to drive the oil to the production well wherein it is produced the improvement which comprises:
    injecting into the injection well in admixture with the surfactant solution sulfomethylated lignite salt in an amount sufficient to adsorb on and occupy the active sites of the formation matrix and thereby diminish surfactant adsorption on said formation matrix.

17. A method as in claim 16 wherein the cation of the sulfomethylated lignite salt is selected from the group consisting of sodium, potassium and ammonium.

18. A method as in claim 16 wherein the amount of sulfomethylated lignite salt present is an amount sufficient to occupy substantially all of the active sites on the formation matrix.

* * * * *